United States Patent
Sinnige

(10) Patent No.: US 6,946,504 B2
(45) Date of Patent: Sep. 20, 2005

(54) FORMULATIONS CONTAINING POLYVINYL ALCOHOL AND SULPHONATED MELAMINE POLYCONDENSATE FOR USE IN GYPSUM SLURRIES

(75) Inventor: Laurence Anthony Sinnige, Niagara-on-the-Lake (CA)

(73) Assignee: Walker Industries Holding Limited, Ontario (CA)

(*) Notice: Subject to any disclaimer, the term of this patent is extended or adjusted under 35 U.S.C. 154(b) by 0 days.

(21) Appl. No.: 10/473,811

(22) PCT Filed: Apr. 2, 2002

(86) PCT No.: PCT/CA02/00487

§ 371 (c)(1),
(2), (4) Date: Mar. 22, 2004

(87) PCT Pub. No.: WO02/081400

PCT Pub. Date: Oct. 17, 2002

(65) Prior Publication Data

US 2004/0147644 A1 Jul. 29, 2004

Related U.S. Application Data

(60) Provisional application No. 60/280,760, filed on Apr. 3, 2001.

(51) Int. Cl.$^7$ ............................................... C08K 3/00
(52) U.S. Cl. ........................ 524/3; 524/475; 524/503; 524/598
(58) Field of Search .................... 524/3, 475, 503, 524/598

(56) References Cited

U.S. PATENT DOCUMENTS

| | | | |
|---|---|---|---|
| 3,784,648 A | * | 1/1974 | Bergmeister et al. ....... 523/332 |
| 3,915,919 A | * | 10/1975 | Nishioka et al. ............. 521/54 |
| 3,935,021 A | | 1/1976 | Greve et al. |
| 4,746,364 A | * | 5/1988 | Kawai et al. .................. 524/4 |
| 5,118,751 A | * | 6/1992 | Schulze et al. ............. 524/503 |
| 5,120,355 A | * | 6/1992 | Imai ............................... 106/2 |
| 5,192,366 A | * | 3/1993 | Nishioka et al. ............ 106/724 |
| 5,432,215 A | * | 7/1995 | Girg et al. ..................... 524/28 |
| 5,437,722 A | * | 8/1995 | Borenstein ................... 106/778 |
| 5,696,553 A | * | 12/1997 | Claret et al. ................. 106/778 |
| 5,728,209 A | * | 3/1998 | Bury et al. .................. 106/819 |
| 5,753,036 A | * | 5/1998 | Hornaman et al. ......... 106/810 |
| 5,968,237 A | * | 10/1999 | Sinnige ........................ 106/2 |
| 6,312,515 B1 | * | 11/2001 | Barlet-Gouedard et al. . 106/709 |
| 6,455,615 B2 | * | 9/2002 | Yu et al. ......................... 524/5 |
| 6,632,861 B1 | * | 10/2003 | Weitzel et al. ................. 524/8 |

FOREIGN PATENT DOCUMENTS

| | | |
|---|---|---|
| EP | 0 496 682 A | 7/1992 |
| EP | 0 669 377 A | 8/1995 |
| FR | 2 707 626 A | 1/1995 |
| JP | 60151286 A * | 8/1985 |
| WO | WO 98 54108 A | 12/1998 |
| WO | WO 99 35103 A | 7/1999 |

OTHER PUBLICATIONS

Chemical Abstracts, vol. 87, No. 2, abstract No. 10488a, p. 300, XP000156304 abstract, Jul. 11, 1977, Columbus, Ohio, U.S. & JP 52 027420 A (A. Tago et al.), Mar. 1, 1977.
Database WPI, Week 198305, Derwent Publications Ltd., London, GB; AN 1983–10502k XP002206801 & JP 57 205349 A (Nitto Chem Ind Co).
Database WPI, Section Ch, Week 198705, Derwent Publications Ltd., London, GB; Class A93, AN 1987–029950 XP002206802 & DD 239 587 A (VEB Harzer Gipswerk), Oct. 1, 1986.

* cited by examiner

Primary Examiner—Bernard Lipman
(74) Attorney, Agent, or Firm—Finnegan, Henderson, Farabow, Garrett & Dunner, LLP

(57) ABSTRACT

Aqueous formulation for enhancing flowability and setting properties of gypsum, slurries, comprising wax, polyvinyl-alcohol and a sulphonated melamine polycondensate are used for imparting water repellency to gypsum wall boards.

5 Claims, 1 Drawing Sheet

FORMULATIONS CONTAINING POLYVINYL ALCOHOL AND SULPHONATED MELAMINE POLYCONDENSATE FOR USE IN GYPSUM SLURRIES

This application claims the benefit of provisional application No. 60/280,760 filed Apr. 3, 2001.

BACKGROUND OF THE INVENTION

1. Field of the Invention

This invention relates to formulations for imparting desired physical properties to gypsum slurries and particularly for gypsum slurries used in the manufacture of gypsum wallboards.

2. Description of the Prior Art

The production of gypsum based materials first involves the preparation of a slurry of calcium sulfate hemihydrate with water. The mixture is allowed to hydrate, or set to the harder calcium sulfate dihydrate, and the excess water is removed by drying through conventional methods. Gypsum products such as wallboard panels comprise a hardened gypsum core sandwiched between paper liners, which form the outside surfaces of the wallboard. One of the problems associated with wallboard panels relates to water or moisture absorption by the hygroscopic gypsum core. Such moisture absorption leads to the weakening of the wall board. To address this moisture absorption problem, the prior art teaches the addition of wax or asphalt compounds to the gypsum slurry to impart hydrophobic qualities to the gypsum core of the board. However, the wax compounds are not readily dispersed within the aqueous gypsum slurry. To address this issue, the prior art, such as U.S. Pat. No. 5,437,722, teaches the inclusion of additives to act as emulsifiers in the slurry. One of the known additives is polyvinyl alcohol (PVA).

Polyvinyl alcohol is added to the gypsum slurry in order to increase the mechanical strength of the wallboard. The polyvinyl alcohol coats the gypsum crystals/particles such that, during the setting of the wallboard, the coated gypsum particles are prevented from returning to the hemihydrate state from the dihydrate. However, the same effects of PVA on the gypsum slurry also has the unwanted side effect of increasing the viscosity (i.e. decreasing the flowability) of the slurry.

As can be understood, the addition of polyvinyl alcohol causes a thickening of the gypsum slurry. In such case, the slurry becomes too thick and is unable to be easily spread. As will be understood, in the manufacture of wall boards or panels this decreased flowability of the gypsum slurry leads to various problems. Firstly, the difficulty in spreading the slurry across the surface of the paper face severely affects the production time required in manufacturing process. Further, the thickening of the slurry leads to the formation of blisters in the wall board during the manufacturing process as explained further below. A further unwanted defect in the wall board is the separation of the paper liner from the hardened gypsum core of the board. This arises from the inability of the slurry to spread and dry over a period of time sufficient to allow the formation of a bond between the slurry with the paper. A poor bond may cause the paper liner to lift up and away from the core leading to production delays and lost revenue.

Attempts have, been made to solve the above-mentioned by problems by either avoiding the use of PVA or adding water or dispersants to the gypsum slurry to increase the flow characteristics of the slurry. However, each of these alternatives is associated with certain problems. Firstly, the removal of the PVA component reduces the strength properties of the final product. The addition of increased amounts of water, although providing better flow properties, increases the drying time (such as within conventionally known dryers) required for the gypsum slurry forming the core of the wallboard to harden. This, of course, leads to increased production costs. It has also been found that the longer drying time leads to a product with reduced mechanical strength. This is due to the finding that the longer drying time hinders the formation of the stronger calcium sulphate dihydrate. A quicker drying time enables the formation of this stronger compound and, therefore, leads to a stronger wallboard.

As an alternative, various dispersants have been proposed for addition to the gypsum slurry containing PVA. Two of the most commonly used dispersants are lignosulphonate, often obtained as a by-product of the pulp and paper industry, and sulphonated naphthalene formaldehyde condensate. There are however, some problems associated with the addition of these dispersants. Firstly, naphthalene compounds generally exhibit a cross-linking reaction in the presence of polyvinyl alcohol, thus producing a thickening of the slurry and decreasing flowability. With a thicker slurry, there is a tendency for the formation of voids within the hardened product. The voids trap water from the slurry and, on heating (for drying the slurry), the water from within these voids is converted to steam. These steam pockets lead to blisters on the surface of the board. In addition, the voids discussed above may also trap air in the form of air bubbles. Such bubbles reduce the mechanical strength of the wallboard.

The addition of lignosulphonate while improving the flowability of the slurry mixture often results in an increase in the required time for the slurry to set. This increased time greatly increases the manufacturing costs.

The present invention seeks to overcome the above described deficiencies in the prior art

SUMMARY OF THE INVENTION

In one embodiment, the present invention provides an aqueous formulation for enhancing the flowability and setting properties of a gypsum slurry comprising a sulphonated melamine polycondensate, or a salt thereof, and polyvinyl alcohol.

In another embodiment, the present invention provides a wax emulsion formulation for enhancing the flowability and setting properties of a gypsum slurry and for imparting water repellant characteristics comprising:

a) a sulphonated melamine polycondensate or a salt thereof;

b) a polyvinyl alcohol; and c) a hydrocarbon wax.

In another embodiment, the present invention provides a water based emulsion formulation for imparting water repellent characteristics to gypsum wall boards comprising:

a) a sulphonated melamine polycondensate or a salt thereof;

b) a polyvinyl alcohol; and c) a hydrocarbon wax.

DESCRIPTION OF THE PREFERRED EMBODIMENTS

Figure 1:
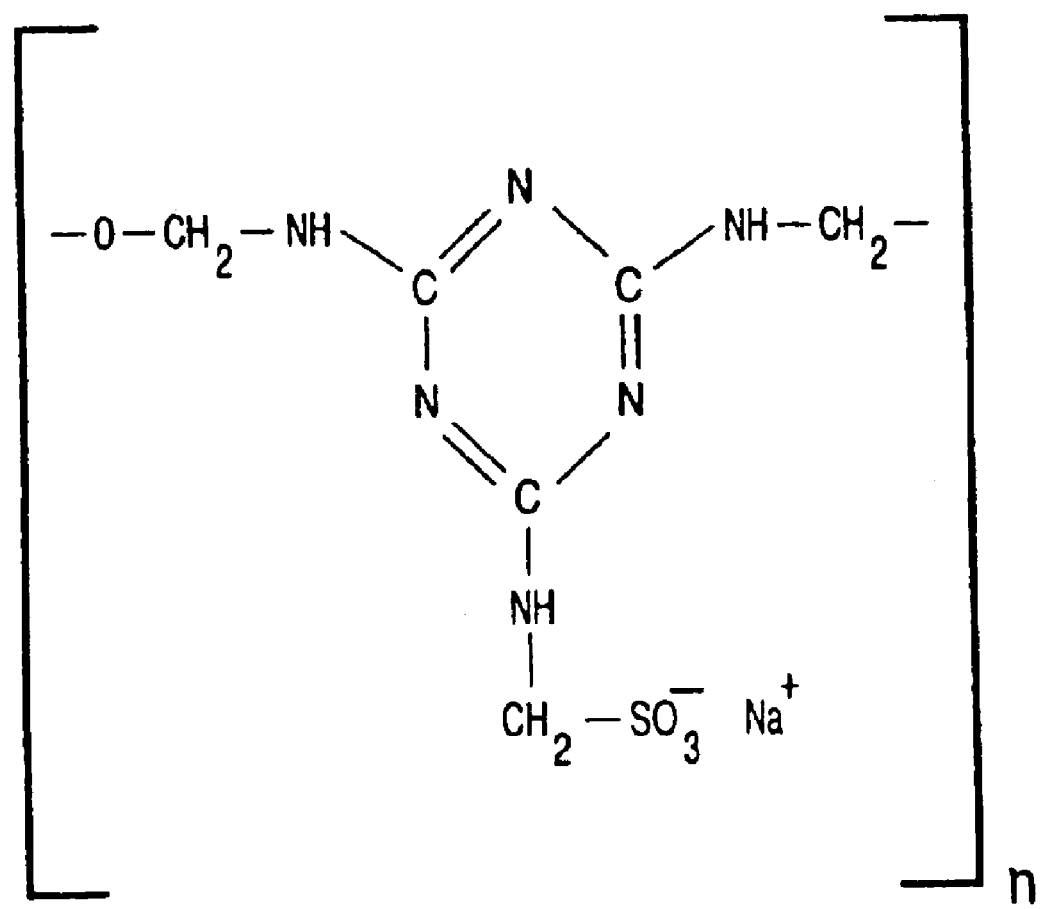
FIG. 1 is a formula of a preferred sulphonated melamine polycondensate of the present invention.

In a broad aspect, the present invention provides a gypsum slurry containing a formulation of polyvinyl alcohol, sulphonated melamine polycondensate (SMP), and a hydrocarbon wax for imparting desired flowability and set properties to the slurry. It has been found that the addition of the SMP imparts flowability characteristics to the gypsum slurry in the presence of PVA. It is believed that this desired characteristic is a result of cross-linking between aldehyde functional groups of the SMP with hydroxyl groups of the polyvinyl alcohol.

The polyvinyl alcohol includes any grade of partially and/or fully hydrolyzed polyvinyl acetate. In the preferred embodiment, the polyvinyl alcohol comprises at least 80% hydrolyzed polyvinyl acetate at the time of addition to the emulsion system. Hydrolysis of the acetate may continue after mixing the alcohol composition into the formulation. The polyvinyl alcohol provides emulsion stability as well as increased stability in the gypsum slurry while providing superior water repellency in the final gypsum product. The combination of polyvinyl alcohol with the blend of wax and SMP provides water repellent properties and other advantages as discussed above which are significantly better than either component when used alone.

The sulphonated melamine polycondensates (SMP) of the present invention are anionic polymeric dispersants produced by a polycondensation chemical reaction. The general formula of a preferred SMP according to the present invention is shown in FIG. 1. It is contemplated that a wide variety of sulphonated melamine polycondensates may be utilized in the present formulation. Examples of suitable sulphonated melamine polycondensates include products under the brand name Melment F10®, Melment F15®, Melment F15G®, Melment F17G®, Melment F245®, all produced by SKW Chemicals Inc, USA; and Meladyne™ from Handy Chemicals, Canada; although others are available. The SMP component can be obtained in either powder form, which needs to be mixed with water to form a solution, or in a pre-mixed form. As is known in the art, the SMP products may comprise salts such as Meladynem™, or melamine sulphonate, which is a sodium salt of poly-melamine sulphonic acid.

The hydrocarbon wax component may comprise any known emulsified hydrocarbon wax including asphalt, paraffin wax, montan wax, carnuba wax, polyethylene wax, synthetic ester waxes, acid waxes, and maleated hydrocarbons, and combinations thereof. Commercially available products such as Norwax® 408X manufactured by Norjohn Emulsions Ltd. are preferable. Generally, the wax component may consist of a hydrocarbon wax having a melt point in the range of 40–110° C. Below this temperature the water repellency of the board may suffer when exposed to warm or hot conditions; above this temperature the wax becomes difficult to emulsify under atmospheric pressure. More specifically, the hydrocarbon wax is generally a petroleum fraction wax, either paraffin or microcrystalline, and may be either in the form of slack or scale waxes, or refined waxes of varying degrees. Synthetic waxes such as ethylenic polymers or hydrocarbon type via Fischer-Tropsch synthesis may be used as well.

As indicated above, one embodiment of the present invention consists of a formulation including PVA and SMP, which can be added to a gypsum slurry to impart the desired strength and viscosity characteristics. As discussed above, the PVA component provides the desired strength properties of the gypsum product. The SMP additive improves the flow properties of the gypsum slurry and avoids the need for the addition of extra water (and the steps and cost associated with removing the excess water). In a preferred embodiment, a hydrocarbon wax is also added to the formulation where water repellency is also desired in the gypsum product such as in gypsum wallboards. It will be apparent to persons skilled in the art that various other known components such as dispersants and stabilizers may be added to the formulation of the present invention.

Comparative Tests

The present invention will be further explained and illustrated by the following comparative examples and test results. These examples are intended to describe the advantageous properties of this invention and not to limit the invention in any way.

Various comparative samples were prepared using calcined gypsum mixed with water to form a slurry, in combination with a 14% PVA solution and:

naphthalene sulphonate lignosulphonate sulphonated melamine polycondensate (SMP)

boric acid

In the samples, no wax was added so as to more clearly observe the interaction between the above listed additives and the PVA component.

These samples were compared using the test procedures outlined below for slurry fluidity and set time. The test solutions were as follows:

A—42% naphthalene sulphonate w/w in $H_2O$ (supplied by Handy Chemicals)

B—36% lignosulphonate w/w in $H_2O$ (supplied by Georgia Pacific)

C—31% sulphonated melamine polycondensate w/w in $H_2O$ (SMP supplied in powder form by SKW Chemicals)

D—0.4 g boric acid added directed to calcined gypsum before mixing

| | Sample Preparation: | | | | |
|---|---|---|---|---|---|
| | Without Polyvinyl Alcohol | | With Polyvinyl Alcohol | | |
| Test Solution | Additive (g) | Calcined Gypsum (g) | Additive (g) | Calcined Gypsum (g) | Polyvinyl Alcohol Sol'n (g) |
| A | 1 | 100 | 1 | 100 | 4 |
| B | 1 | 100 | 1 | 100 | 4 |
| C | 1 | 100 | 1 | 100 | 4 |
| D | 4 | 100 | 4 | 100 | 4 |

Tests Conducted

1. Fluidity of Gypsum Slurry

In order to demonstrate the effect of polyvinyl alcohol in combination with the additives A, B, C and D on the fluidity of the gypsum slurry, the following procedure was employed. 100 g calcined gypsum was mixed with water to form a slurry. A first set of four samples were prepared without the addition of polyvinyl alcohol. One gram of each of the test solutions was mixed with the slurry. After a mixing period of one minute, the slurry was poured into a slump tube, the slump tube was then lifted above a 12"×12" glass plate, and the slurry was permitted to spread over the surface of the plate. The diameter of the resulting gypsum patty was then measured. A larger diameter patty is indicative of improved flow and consistency of the gypsum slurry. A second set of four samples was prepared again using 100 g calcined gypsum mixed with water to form a slurry. 4 g of a 14% polyvinyl alcohol solution w/w in H₂O was added to each of the samples in addition to the one-gram of each of the test solutions. The samples were mixed according to the aforementioned test process. The results of this test are provided below.

2. Set Time of Gypsum Slurry

A second test was carried out on each of the above mentioned samples to determine the set time of each of the patties. The set time was determined by placing a weighted needle on the surface of the patty. The patty was deemed set to sufficient hardness when the needle was prevented from penetrating the surface to a depth of one mm. The set time was recorded at this point. The results of these tests are provided below.

Results of Tests 1 and 2

| Test Solution | Without Polyvinyl Alcohol | | With Polyvinyl Alcohol | |
| --- | --- | --- | --- | --- |
| | Slump Diameter (inches) | Set Time (minutes) | Slump Diameter (inches) | Set Time (minutes) |
| A | 7-1/4 | 6 | 4 | 6.5 |
| B | 7 | 9 | 7-1/2 | 10.25 |
| C | 7-1/2 | 6.5 | 7-1/2 | 7 |
| D | 8 | 6.5 | Could not pour | N/A |

Comparative Test—Solution A

These results indicate that the presence of polyvinyl alcohol in combination with the naphthalene test solution resulted in a reduced fluidity of the gypsum slurry. This was evident by the substantial decrease in the patty diameter as compared to a slurry having no polyvinyl alcohol present. The set time of the patty appeared generally unaffected by the presence of the naphthalene in combination with the polyvinyl alcohol.

Comparative Test—Solution B

These results indicate that the presence of polyvinyl alcohol in combination with the lignosulphonate test solution demonstrated little change on the fluidity of the gypsum slurry. The set time of the patty however, in the presence polyvinyl alcohol, was much longer than that of comparative test involving Solution A.

Comparative Test—Solution C

These results indicate that the presence of polyvinyl alcohol in combination with the sulphonated melamine polycondensate test solution, had little effect on either of the fluidity of the gypsum slurry or the set time of the patty.

Comparative Test—Solution D

These results indicate that the presence of polyvinyl alcohol in combination with the boric acid test solution, caused a thickening of the gypsum slurry such that the material was unable to be poured into the slump tube.

An optimum formulation in terms of both the fluidity of the slurry in combination with a minimal set time was achieved by the addition of the sulphonated melamine polycondensate, test solution "C", to a gypsum slurry containing polyvinyl alcohol. This is illustrated by the result summarized in the above table. The absence of any impact on both the fluidity and the set time upon the introduction of polyvinyl alcohol translates into consistency of performance characteristics over time combined with reduced manufacturing costs and ease of use.

Example of Formulation

The following is an example of a formulation of the present invention:

| Component | Wt % |
| --- | --- |
| Hydrocarbon wax | 34.6% |
| Polyvinyl alcohol | 2.6% |
| Meladyne ™ (melamine sulphonate) | 3.7% |
| Water | 58.1% |
| Dispersants and stabilizers | 1.0% |
| Total | 100.0% |

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A gypsum wax emulsion slurry for use in the manufacture of gypsum wallboards having water repellent characteristics, said slurry comprising:

a) a sulphonated melamine polycondensate or a salt thereof;

b) a polyvinyl alcohol;

c) a hydrocarbon wax;

d) a gypsum; and e) water.

2. The slurry of claim 1 wherein the sulphonated melamine polycondensate is anionic.

3. The slurry of claim 1 wherein the polyvinyl alcohol comprises a grade of partially or fully hydrolyzed polyvinyl acetate.

4. The slurry of claim 3, wherein the polyvinyl alcohol comprises at least 80% hydrolyzed polyvinyl acetate.

5. The slurry according to claim 1, wherein the hydrocarbon wax is selected from the group consisting of: a wax having a melting point in the range of 40° to 110° C.; a petroleum fraction wax; a paraffin wax, and mixtures thereof.

* * * * *